United States Patent
Jiang et al.

(12) United States Patent    (10) Patent No.: US 12,174,787 B2
Jiang et al.    (45) Date of Patent: Dec. 24, 2024

(54) METHOD, DEVICE, AND COMPUTER PROGRAM PRODUCT FOR PROCESSING DATA

(71) Applicant: Dell Products L.P., Round Rock, TX (US)

(72) Inventors: Changxu Jiang, Chengdu (CN); Fei Wang, Chengdu (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/209,108

(22) Filed: Jun. 13, 2023

(65) Prior Publication Data
US 2024/0184744 A1    Jun. 6, 2024

(30) Foreign Application Priority Data
Dec. 2, 2022 (CN) .......................... 202211542723.5

(51) Int. Cl.
*G06F 16/00* (2019.01)
*G06F 16/11* (2019.01)

(52) U.S. Cl.
CPC .................................. *G06F 16/122* (2019.01)

(58) Field of Classification Search
CPC ..................................................... G06F 16/122
See application file for complete search history.

(56) References Cited

U.S. PATENT DOCUMENTS

| | | | |
|---|---|---|---|
| 9,176,883 B2 | 11/2015 | Yang | |
| 9,413,527 B2 | 8/2016 | Yang et al. | |
| 9,582,222 B2 | 2/2017 | Yang et al. | |
| 10,158,483 B1* | 12/2018 | Newman | H04L 9/3242 |
| 10,635,316 B2 | 4/2020 | Singh et al. | |
| 10,678,431 B1* | 6/2020 | Smaldone | G06F 3/0604 |
| 2009/0132619 A1* | 5/2009 | Arakawa | G06F 3/0641 |
| 2010/0162039 A1* | 6/2010 | Goroff | G06F 11/1451 |
| | | | 714/E11.03 |
| 2011/0197022 A1* | 8/2011 | Green | G06F 3/0664 |
| | | | 711/E12.001 |
| 2013/0218847 A1* | 8/2013 | Saika | G06F 16/182 |
| | | | 707/E17.002 |
| 2020/0356292 A1* | 11/2020 | Ippatapu | G06F 11/1453 |

* cited by examiner

*Primary Examiner* — Syed H Hasan
(74) *Attorney, Agent, or Firm* — BainwoodHuang (57) ABSTRACT

Techniques involve determining, in response to acquiring a target block size for a shared folder of a first file system in a file system set, a shared folder de-duplication rate. The techniques further involve acquiring a de-duplication block size set supported by a storage system set for the file system set in response to determining that the de-duplication rate is less than a threshold de-duplication rate. The techniques further involve determining whether the de-duplication block size set includes a de-duplication block size that is the same as the target block size. The techniques further involve migrating the shared folder to a second file system in response to the de-duplication block size set including the de-duplication block size that is the same as the target block size. Accordingly, there is improved efficiency in deleting duplicate data, increased amount of deleted duplicate data, saved storage space and improved resource utilization.

20 Claims, 8 Drawing Sheets

METHOD, DEVICE, AND COMPUTER PROGRAM PRODUCT FOR PROCESSING DATA

CROSS-REFERENCE TO RELATED APPLICATION

This application claims priority to Chinese Patent Application No. CN202211542723.5, on file at the China National Intellectual Property Administration (CNIPA), having a filing date of Dec. 2, 2022, and having "METHOD, DEVICE AND COMPUTER PROGRAM PRODUCT FOR PROCESSING DATA" as a title, the contents and teachings of which are herein incorporated by reference in their entirety.

TECHNICAL FIELD

Embodiments of the present disclosure generally relate to the field of data processing, and in particular, to a method, a device, and a computer program product for processing data.

BACKGROUND

A distributed file system (DFS) provides a plurality of functions: directory tree view, load balancing, automatic failover, and the like. Details of an underlying infrastructure are hidden from users through the directory tree view. In addition, the DFS provides access to different storage systems.

Storage systems now used for providing services for file systems may include high cost storage systems formed by solid state drives and low cost storage systems formed by solid state drives and mechanical hard disk drives. Due to the high storage cost of the high cost storage systems, different storage systems are usually selected to provide back-end storage services for different applications. When a plurality of storage systems are used for providing back-end storage services, the storage systems may each maintain its own de-duplication hash table to delete duplicate data. However, there are still many problems to be solved in a process of deleting duplicate data.

SUMMARY OF THE INVENTION

Embodiments of the present disclosure provide a method, a device, and a computer program product for processing data.

According to a first aspect of the present disclosure, a method for processing data is provided. The method includes determining, in response to acquiring a target data block size for a shared folder of a first file system in a file system set, a de-duplication rate for the shared folder, the de-duplication rate indicating a degree to which storage space is saved; The method also includes acquiring a de-duplication block size set supported by a storage system set for the file system set in response to determining that the de-duplication rate is less than a threshold de-duplication rate. The method further includes determining whether the de-duplication block size set includes a de-duplication block size that is the same as the target data block size. The method further includes migrating the shared folder to a second file system in the file system set in response to the de-duplication block size set including the de-duplication block size that is the same as the target data block size, the second file system being located on a storage system having the de-duplication block size in the storage system set.

According to a second aspect of the present disclosure, an electronic device is provided. The electronic device includes at least one processor; and a memory coupled to the at least one processor and having instructions stored thereon, wherein the instructions, when executed by the at least one processor, cause the device to execute actions including: in response to acquiring a target data block size for a shared folder of a first file system in a file system set, determining a de-duplication rate for the shared folder, the de-duplication rate indicating a degree to which storage space is saved; acquiring a de-duplication block size set supported by a storage system set for the file system set in response to determining that the de-duplication rate is less than a threshold de-duplication rate; determining whether the de-duplication block size set includes a de-duplication block size that is the same as the target data block size; and migrating the shared folder to a second file system in the file system set in response to the de-duplication block size set including the de-duplication block size that is the same as the target data block size, the second file system being located on a storage system having the de-duplication block size in the storage system set.

According to a third aspect of the present disclosure, a computer program product is provided, which is tangibly stored on a non-volatile computer-readable medium and includes machine-executable instructions, wherein the machine-executable instructions, when executed, cause a machine to perform steps of the method in the first aspect of the present disclosure.

BRIEF DESCRIPTION OF THE DRAWINGS

By more detailed description of example embodiments of the present disclosure with reference to the accompanying drawings, the above and other objectives, features, and advantages of the present disclosure will become more apparent, where identical reference numerals generally represent identical components in the example embodiments of the present disclosure.

In the drawings, identical or corresponding numerals represent identical or corresponding parts.

DETAILED DESCRIPTION

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The embodiments of the present disclosure will be described in more detail below with reference to the accompanying drawings. Although the accompanying drawings show some embodiments of the present disclosure, it should be understood that the present disclosure can be implemented in various forms, and should not be explained as being limited to the embodiments stated herein. Rather, these embodiments are provided for understanding the present disclosure more thoroughly and completely. It should be understood that the accompanying drawings and embodiments of the present disclosure are for illustrative purposes only, and are not intended to limit the protection scope of the present disclosure.

In the description of the embodiments of the present disclosure, the term "include" and similar terms thereof should be understood as open-ended inclusion, i.e., "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below.

As mentioned above, for duplicate data deletion, only incoming data blocks that hit entries in a de-duplication hash table have the opportunity for duplicate data deletion. The quantity of de-duplication items greatly affects a hit rate of de-duplication, and then affects the size of de-duplication space. In order to improve the efficiency of inline de-duplication, a cache algorithm is optimized to only retain entries with high de-duplication probability levels in the de-duplication hash table. The longer a data block is in the hash cache, the higher the probability of hitting entries for de-duplication is.

In general, de-duplication entries are managed by a storage system itself. When a hybrid storage system performs de-duplication, it lacks awareness of a global pattern of incoming data blocks. In addition, because host Input/Output (I/O) sizes for different applications are different, and these hybrid storage systems may be different products, they may not be capable of providing de-duplication for a host I/O whose incoming data block size is smaller than a de-duplication block size thereof. For example, when a file system mainly contains a data block size of 4 KB and is serviced by a storage system that supports a de-duplication data block size of 8 KB, the incoming data block for the text system may lose the possibility of de-duplication.

At least to solve the above and other potential problems, a method for processing data is provided in the embodiments of the present disclosure. A computing device first acquires a target data block size for a shared folder of a first file system in a file system set. If the target data block size of the shared folder for the first file system in the file system set is acquired, whether a de-duplication rate for the shared folder is less than a threshold de-duplication rate is determined. If the de-duplication rate for the shared folder is less than the threshold de-duplication rate, a de-duplication block size set supported by a storage system set for the file system set is acquired. Then, whether the de-duplication block size set includes a de-duplication block size that is the same as the target data block size is determined. If the de-duplication block size exists in the de-duplication block size set, the shared folder is migrated to a second file system in the file system set. The method can improve the efficiency of deleting duplicate data and increase the amount of deleted duplicate data, thereby saving storage space and improving the resource utilization.

Figure 1:
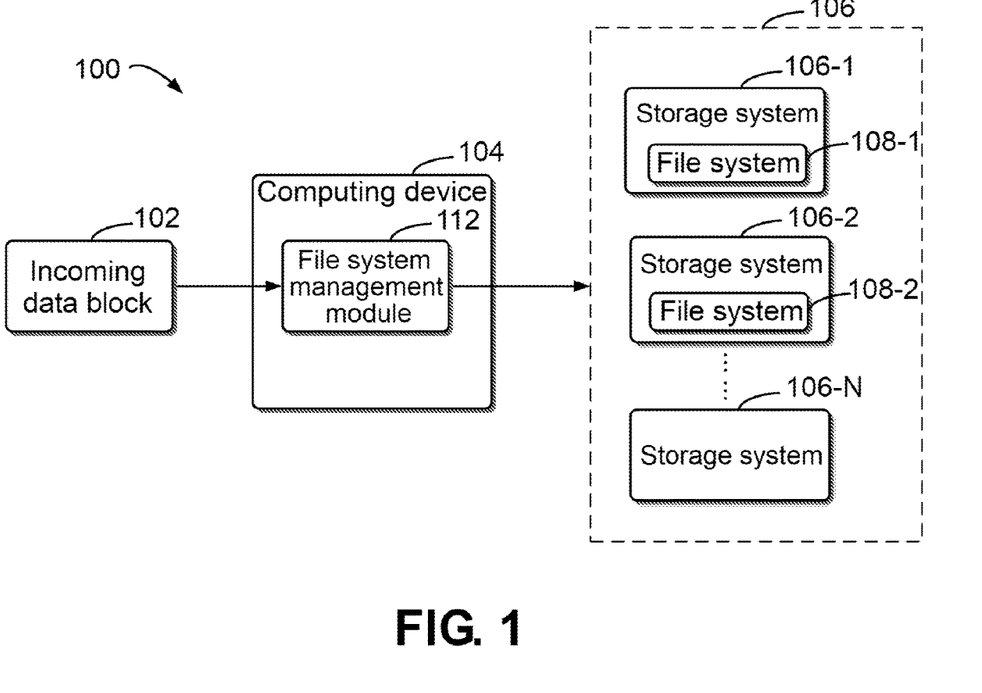
FIG. 1 illustrates a schematic diagram of an example environment in which a device and/or a method according to embodiments of the present disclosure can be implemented.

The embodiments of the present disclosure will be further described in detail below with reference to the accompanying drawings, wherein FIG. 1 shows an example environment in which a device and/or a method according to an embodiment of the present disclosure can be implemented.

As shown in FIG. 1, example environment 100 includes computing device 104, and computing device 104 may be used for analyzing incoming data block 102 stored in a file system to manage a shared folder or shared domain in the file system.

Incoming data block 102 comes from an application on a host used for accessing the shared folder in the file system. Because I/O sizes of different hosts are different, a shared folder or shared domain in the file system may receive incoming data blocks with different data block sizes. In one example, the size of the incoming data block is 4 KB. In another example, the size of the incoming data block is 8 KB. In another example, the size of the incoming data block is 16 KB. The above examples are only used for describing the present disclosure, and are not intended to specifically define the present disclosure.

File system management module 112 is running on computing device 104. Example computing device 104 includes, but is not limited to, a personal computer, a server computer, a handheld or laptop device, a mobile device, a multiprocessor system, a consumer electronic product, a minicomputer, a mainframe computer, a distributed computing environment including any of the above systems or devices, and the like.

File system management module 112 is used for managing a shared folder or shared domain on the file system. Specifically, file system management module 112 may use the sizes of most of incoming data blocks into the shared folder of the file system as the target data block size of the shared folder. Then, file system management module 112 may determine the de-duplication rate of the shared folder after acquiring the target data block size of the shared folder, and adjust a location of the shared folder in the file system according to the de-duplication rate to improve the de-duplication rate of the shared folder in the file system. File system management module 112 shown in FIG. 1 is located on computing device 104, which is only an example and not a specific limitation to the present disclosure. File system management modules may also be arranged in one storage system or a plurality of storage systems in the storage system set.

Storage system set 106 includes a plurality of storage systems 106-1, 106-2, . . . , 106-N, where N is a positive integer. Each of the plurality of storage systems in storage system 106 may have the same de-duplication block size or a different de-duplication block size. The de-duplication block size indicates a predetermined data block size used by the storage system for generating a hash value in the de-duplication hash table. Typically, each storage system has a de-duplication block size. In one example, the de-duplication block size is 4 KB. In another example, the de-duplication block size is 8 KB. The above examples are only used for describing the present disclosure, and are not intended to specifically define the present disclosure.

Storage system set 106 runs a file system set, and the file system set together provides services for I/Os from user hosts. The file system set includes one or more file systems, where each file system is formed on a storage system. Alternately or additionally, one storage system may run a plurality of file systems. As shown in FIG. 1, the file system set includes two file systems, namely, file system 108-1 and file system 108-2, which is only an example and is not a specific limitation to the present disclosure. For a file system in the storage system set, such as file system 108-1 or file system 108-2, the migration of the shared folder in the file system may be determined by file system management module 112. File system management module 112 and the file system set on the storage system set may form a combined file system.

The method can improve the efficiency of deleting duplicate data and increase the amount of deleted duplicate data, thereby saving storage space and improving the resource utilization.

An example environment in which the device and/or method according to an embodiment of the present disclosure may be implemented has been described above with reference to FIG. 1. A schematic structural diagram of a combined file system and an example of processing data blocks according to embodiments of the present disclosure are described below with reference to FIG. 2A and FIG. 2B.

Figure 2A:
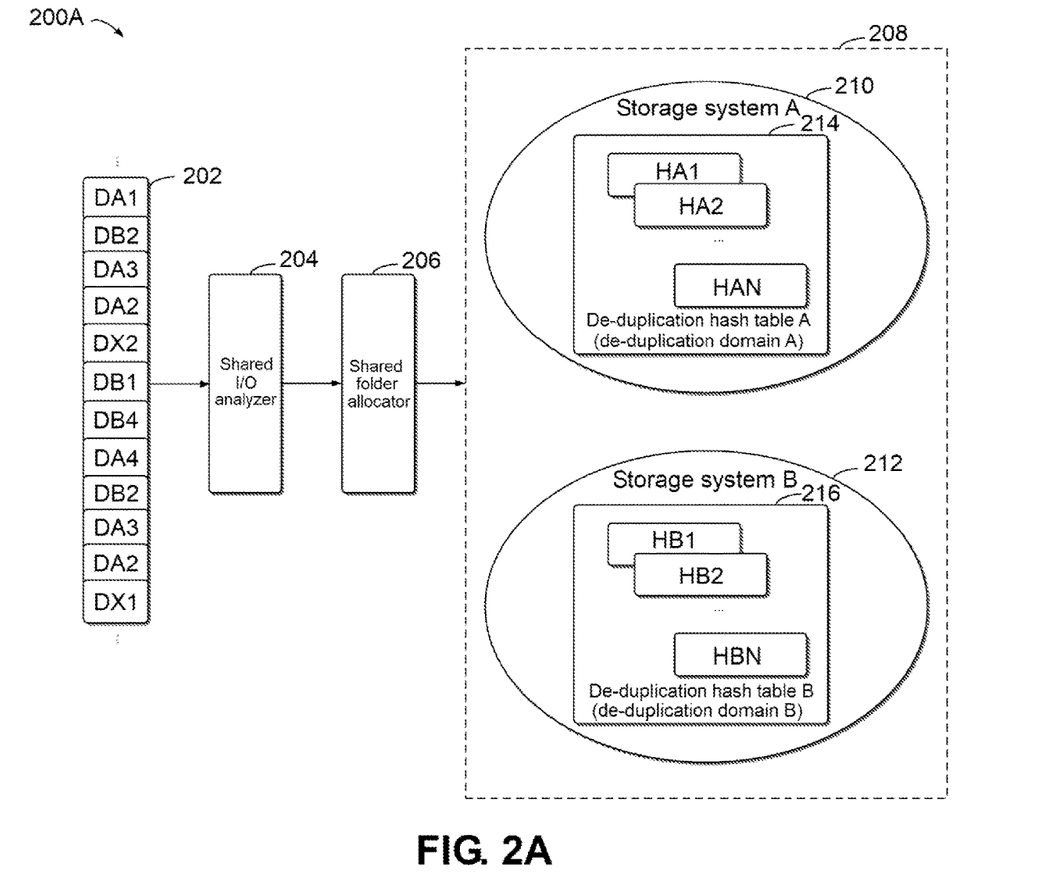
FIG. 2A illustrates a schematic structural diagram of a combined file system according to an embodiment of the present disclosure.

As shown in FIG. 2A, example structure 200 of the combined file system includes shared I/O analyzer 204 and shared folder allocator 206. For example, file system management module 112 in FIG. 1 includes shared I/O analyzer 204 and shared folder allocator 206. Shared I/O analyzer 204 is used for analyzing incoming data block 202 or write I/O on different shared folders to record some attributes of the incoming data block on each shared file. Shared I/O analyzer 204 is triggered when creating a shared folder on the file system, and then it may continuously monitor incoming data blocks on the shared file until a stop condition is met, for example, determine the target data block size of the shared folder in a predetermined period of time. If the target data block size of the shared folder cannot be determined in a predetermined period of time, the analysis may continue in a next predetermined period of time. When meeting the stop condition, shared I/O analyzer 204 outputs the target data block size for the shared folder. The target data block size indicates the size of most of incoming data blocks in the shared folder.

After shared I/O analyzer 204 determines the target data block size for the shared folder, it is necessary to determine the de-duplication rate of the shared folder through shared folder allocator 206, and then determine, according to the de-duplication rate, whether the shared folder needs to be migrated between different storage systems. The de-duplication rate is obtained by calculation based on the storage space saved by de-duplication of the shared folder.

As shown in FIG. 2A, storage system set 208 includes two storage systems: storage system A 210 and storage system B 212. Storage system A includes de-duplication hash table A 214, which may also be used as de-duplication domain A. De-duplication hash table A 214 includes a plurality of hash entries HA1 to HAN, and each entry is used for storing a hash value of a stored incoming data block. When the incoming data block is to be stored in storage system A, the hash value of the incoming data block may be compared with the entries in de-duplication hash table A 214. If a corresponding hash value is found in the hash table, it indicates that the incoming data block has been stored, and it is only necessary to use an address of the stored incoming data block as a storage address of the incoming data block, and the incoming data block does not need to stored. Storage system B 212 includes de-duplication hash table B 216 for the de-duplication domain of storage system B, which is used for de-duplicating incoming data blocks into storage system B 212. De-duplication hash table B 216 includes a plurality of hash entries HB1 to HBN, and each entry is used for storing a hash value of a data block. The de-duplication hash table is used to determine which incoming data blocks may be de-duplicated, and the de-duplication rate for a shared folder may be obtained.

After the shared folder is migrated through the de-duplication rate, the shared folder with a higher de-duplication rate in storage system A may be migrated to storage system A or remain unchanged in storage system A, and a shared folder with a higher de-duplication rate in storage system B may be migrated to storage system B or remain unchanged in storage system B.

Figure 2B:
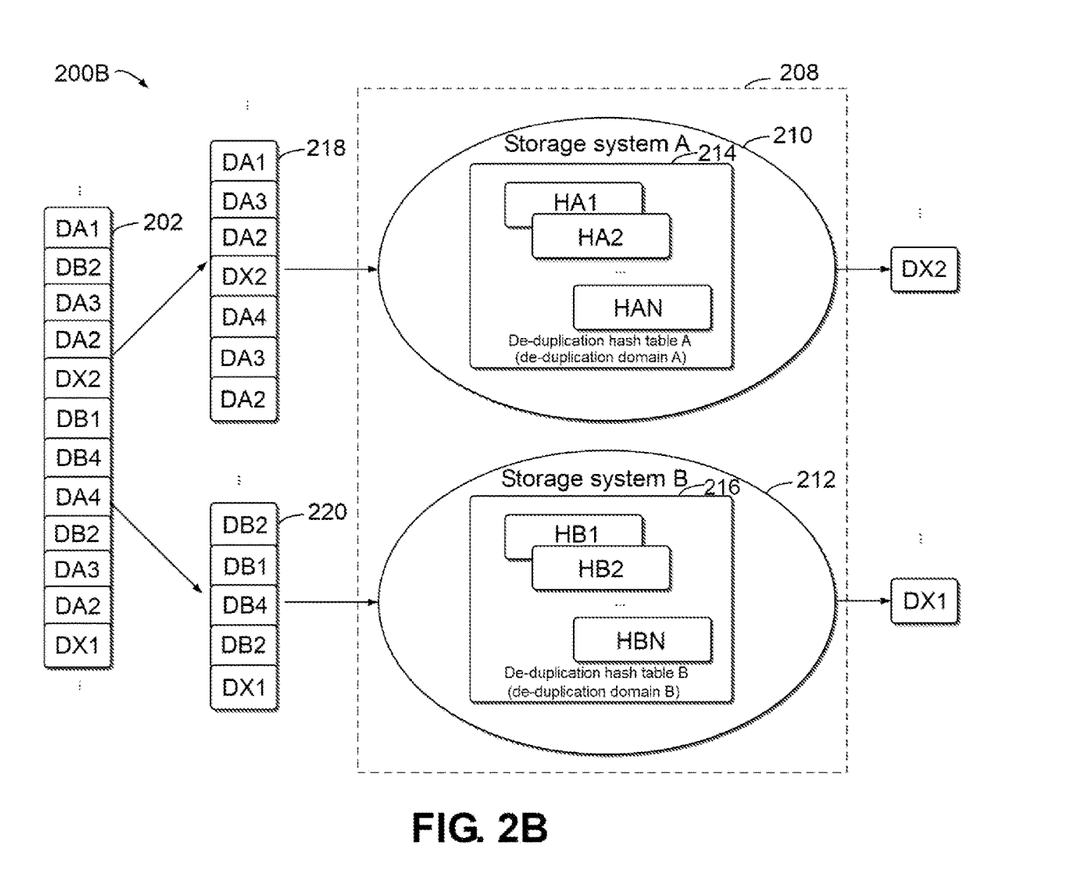
FIG. 2B illustrates a schematic diagram of an example for processing data according to an embodiment of the present disclosure.

As shown in FIG. 2B, after adjusting the location of the shared folder in the storage system, the incoming data blocks may be separated according to the shared folders they access. As shown in FIG. 2, among the plurality of incoming data blocks 202, DAn represents data block n to be written to the storage system in the plurality of incoming data blocks 202, where n is a positive integer, n≤N, and DAn may hit hash entry HAn; DBn represents data block n to be written to the storage system, and DBn may hit hash entry HBn; DXn represents data block n to be written to the storage system, and DXn cannot hit any de-duplication hash entry in de-duplication hash table A and de-duplication hash table B. The shared folders to be accessed by these data are moved to corresponding storage systems of different de-duplication domains, and thus a plurality of incoming data blocks will be divided into two groups of data blocks 218 and 220. First group of data 218 will be stored in storage system A 210 because the shared folder it accesses is located in storage system A 210. Second group of data 220 will be stored in storage system B 212 because the shared folder it accesses is located in storage system B. After the de-duplication operation, only data blocks DX1 and DX2 need to be stored. This improves the de-duplication effect, reduces the amount of data to be stored, and improves the resource utilization. FIG. 2A and FIG. 2B show that the storage system set includes two storage systems, which is only an example and not a specific limitation to the present disclosure. Storage system set 208 may include any suitable number of storage systems.

Figure 3:
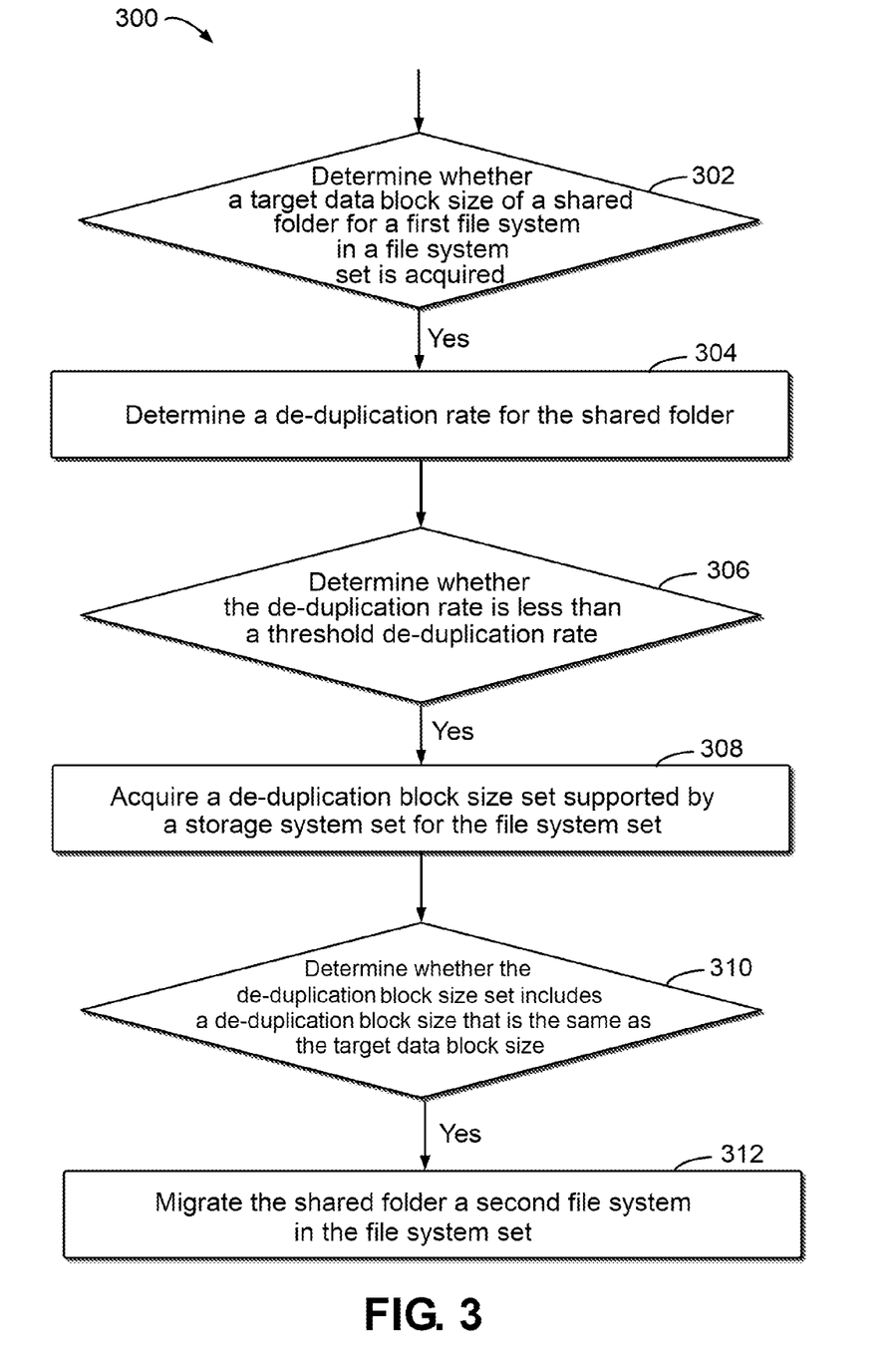
FIG. 3 illustrates a flow chart of a method for processing data according to an embodiment of the present disclosure.

FIG. 2A and FIG. 2B above describe an example structure of a combined file system and an example of processing data according to an embodiment of the present disclosure. A schematic diagram of processing data is further described below with reference to FIG. 3, where FIG. 3 illustrates a flow chart of a method for processing data according to an embodiment of the present disclosure. The method in FIG. 3 may be performed on computing device 104 in FIG. 1 or any suitable computing device.

At block 302, whether a target data block size for a shared folder of a first file system in a file system set is acquired is determined. For example, file system management module 112 or shared folder allocator 206 in computing device 104 may monitor whether the target data block size for the shared folder in the file system is acquired.

In some embodiments, a shared folder is created in the first file system. After creating the shared folder, file system management module 112 or shared I/O analyzer 204 determines the target data block size of the shared folder as an initial data block size, for example, determines that the initial block size is 8 KB. File system management module 112 or shared I/O analyzer 204 then starts monitoring a plurality of incoming data blocks into the shared folder in a predetermined period of time. File system management module 112 or shared I/O analyzer 204 may also determine a plurality of candidate data block sizes for the shared folder. For example, the candidate data block sizes may be 4 KB, 8 KB, 16 KB, and the like, for indicating a possible size of an incoming data block. In this predetermined period of time, if an incoming data block corresponding to the size of one of the candidate data block sizes is received, the number corresponding to the candidate data block size is added. Therefore, shared file system management module 112 or shared I/O analyzer 204 can determine the distribution of the plurality of incoming data blocks into the shared folder in the predetermined period of time on the plurality of candidate data block sizes, wherein the distribution includes a plurality of numbers of incoming data blocks corresponding to the plurality of candidate data block sizes, for example, the number of incoming data blocks corresponding to each candidate data block size. Then, the shared file system management module 112 or shared I/O analyzer 204 determines, according to the distribution, the adjustment of the target data block size. In this way, the size of most of incoming data blocks into the shared folder may be determined quickly, and the migration of shared files may be promoted, thereby improving the accuracy and efficiency of folder migration.

In some embodiments, when determining the adjustment of the target data block size, shared folder allocator 206 determines a maximum number of the plurality of numbers of the incoming data blocks corresponding to the plurality of candidate data block sizes. Then, it is determined whether the maximum number is greater than a first threshold, wherein the first threshold is used for instructing outputting the data block size of the shared folder. If it is greater than the first threshold, it indicates that the target data block size of the shared folder needs to be output. After it is determined that the maximum number is greater than the first threshold, it is also necessary to further determine whether the maximum number is greater than a second threshold, and the second threshold is used for instructing updating the data block size of the shared folder. If the maximum number is greater than the second threshold, the target data block size for the shared folder is updated to a candidate data block size corresponding to the maximum number among the plurality of candidate data block sizes. If the maximum number is less than or equal to the second threshold, the target data block size is not adjusted, and the target data block size is determined to be an initial value thereof. In this way, the value of the target data block size of the shared folder to be output may be determined quickly.

In some embodiments, if the maximum number is less than or equal to the first threshold, a next predetermined period of time is used for continuing to determine the distribution of the incoming data blocks into the shared folder on the plurality of candidate data block sizes, for determining the adjustment of the target data block size.

A specific example of a working process of the shared I/O analyzer is described below: E is used for recording a list of target block sizes, in a unit of KB, and e[n] is the target data block size of shared folder n; total_ios represents the total number of incoming data blocks into the shared folder after the shared I/O analyzer starts tracking the shared folder; and T is a time interval used for checking whether the shared I/O analyzer meets a stop rule. WM represents a threshold used for the stop rule, for example, 90%.

S1: When a new shared folder or shared domain n is created, initialize a shared I/O analyzer for shared folder n.

A target block size of initialized shared folder n is e[n]=8, candidate data block size set C=[S, 4, 8, 16], in a unit of KB. S indicates the data block size smaller than 4 KB, nh[i]=0, for i∈{1, . . . , M}, where NH is used for recording the number of incoming data block sizes with different data block size ranges, nh[i] is used for indicating the number for C[i], and M is the number of candidate data block sizes in the candidate data block size set or the length of C, and total_ios=0.

S2: Track the incoming data block size to a host I/O of shared folder n and update the record:
Update total_ios for an incoming data block,
if the incoming data block has a data block size<c[2] KB:
  increase by nh[1]
else if the incoming data block has a data block size<c[3] KB:
  increase by nh[2]
else if the incoming data block has a data block size<c[4] KB:
  increase by nh[3]
else:
  increase by nh[4]
S3: At each T interval, check whether NH meets a stop criterion, and if yes, update an analysis result to serve as new e[n], else, and return to S2.
Pseudo code for the S3 part is as follows:
If max (NH) is greater than selector_threshold:
//selector_threshold is a threshold of the number of I/Os used for triggering outputting the target data block size or a threshold of the incoming data block size
  if max(NH)>total_ios*WM:
  //update e[n] as the analysis result
    output e[n]=C[arg max (NH)]//arg is used for determining a location of a data block size corresponding to max(NH) in C;
  else://keep e[n] as an initial value
    output e[n]
  else:
return to S2.

The example of the working process of the shared I/O analyzer and acquisition of the target data block size for the shared folder are described above.

After the target data block size for the shared folder of the first file system in the file system set is acquired, the de-duplication rate for the shared folder is determined at block 304, and the de-duplication rate indicates a degree to which storage space is saved. For example, file system management module 112 or shared folder allocator 206 determines the de-duplication rate of the newly created shared folder.

In some embodiments, file system management module 112 or shared folder allocator 206 determines a de-duplication saved space for the shared folder. File system management module 112 or shared folder allocator 206 then determines a logical use space for the shared folder. After the de-duplication saved space and logical use space are obtained, the de-duplication rate is determined by the de-duplication saved space and the logical use space. For example, total_entry_num indicates the number of de-duplication hash entries, which is subject to the size of the de-duplication hash table. entry_hit_ratio indicates a sum of hash entry hits counted in a unit time, and deduped_space indicates space saved by de-duplication in the unit time, which is defined by the following Equation (1):

deduped_space=total_entry_num*entry_hit_
   ratio*dedupe_chunk_size          (Equation 1)

where dedupe_chunk_size indicates the size of the de-duplicated data block. logical_used_space is a logical used space on shared folder n, which is the used storage space without de-duplication operations. Then, the de-duplication rate of shared folder n is calculated based on the following Equation (2):

$$D[n] = \frac{deduped\_space}{logical\_used\_space}$$ (Equation 2)

where D is a set used for recording a de-duplication rate attribute of each shared folder, where D[n] records a de-duplication rate attribute of shared folder n.

At block 306, whether the de-duplication rate is less than a threshold de-duplication rate is determined. For example, file system management module 112 or shared folder allocator 206 is used for determining whether the de-duplication rate of the shared folder is less than the threshold de-duplication rate. For example, D[n] may be calculated by Equation 2 above, and whether it is less than D_LWM is then determined, where D_LWM is a threshold used for checking whether the de-duplication rate is too low. If D[n] is less than D_LWM, the shared folder may be migrated to another file system having a more suitable de-duplication domain.

If it is determined that the de-duplication rate is less than the threshold de-duplication rate, at block 308, a de-duplication block size set supported by the storage system set for the file system set is acquired. For example, file system management module 112 or shared folder allocator 206 may acquire a set of de-duplication block sizes supported by the storage system set for the file system set. If the storage system set for the file system set includes two storage systems, one storage system supports a de-duplication block size of 8 KB, and the other storage system supports a de-duplication block size of 4 KB, then the de-duplication block size set for the storage system set is [4, 8].

At block 310, whether the de-duplication block size set includes a de-duplication block size that is the same as the target data block size is determined. If it is determined that the de-duplication block size set includes the de-duplication block size that is the same as the target data block size, at block 312, the shared folder is migrated to a second file system in the file system set, where the second file system is located on a storage system having the de-duplication block size in the storage system set. For example, if the target data block size of the shared folder in the file system on the storage system that supports the de-duplication block size of 8 KB is 4 KB, and the de-duplication rate of the shared folder is low, the shared folder may be managed by finding a file system on the storage system having the de-duplication block size of 4 KB through the de-duplication block size set. The migration of the shared folder to the second file system in the file system set and operations when it is determined that the de-duplication block size set does not include the de-duplication block size that is the same as the target data block size will be described below with reference to FIG. 4.

The method can improve the efficiency of deleting duplicate data and increase the amount of deleted duplicate data, thereby saving storage space and improving the resource utilization.

Figure 4:
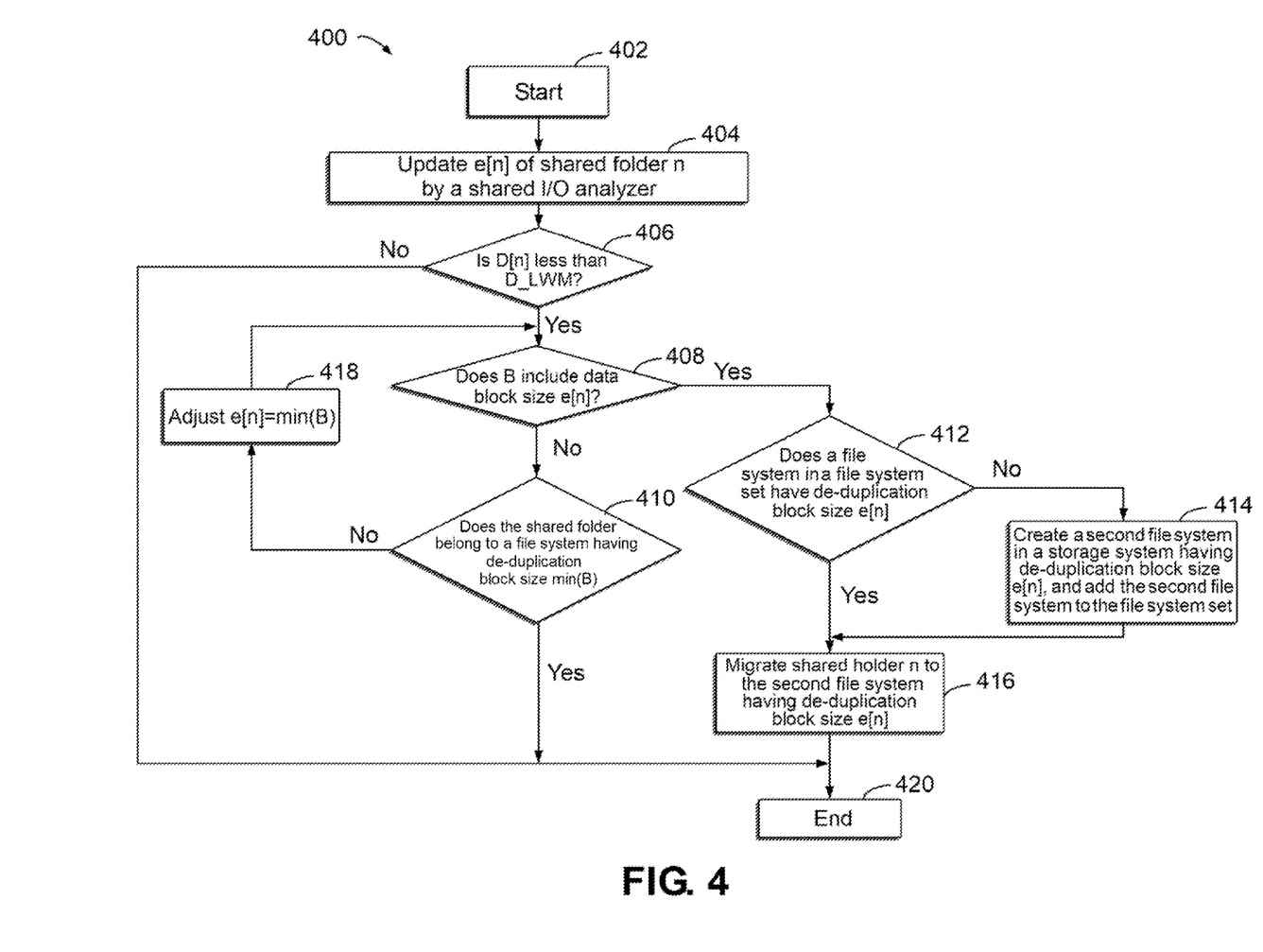
FIG. 4 illustrates a flow chart of an example for processing data according to an embodiment of the present disclosure.

FIG. 3 above describes a schematic diagram of processing data according to an embodiment of the present disclosure. A schematic diagram of processing data is further described below with reference to FIG. 4, where FIG. 4 is a flow chart of an example for processing data according to an embodiment of the present disclosure. The method in FIG. 4 may be performed on computing device 104 in FIG. 1 or any suitable computing device.

Process 400 starts from 402. At block 404, block size e[n] of shared folder n is updated by the shared I/O analyzer. After the update is completed, at block 406, whether de-duplication rate D[n] of shared folder n is less than threshold D_LWM is determined. If de-duplication rate D[n] is not less than threshold D_LWM, it indicates that the data de-duplication rate in the shared folder is high, and there is no problem in de-duplication. Therefore, the processing may be ended at block 420.

If D[n] is less than threshold D_LWM, at block 408, it is necessary to further determine whether de-duplication block size set B supported by the storage system set used for providing data storage services for the file system set includes data block size e[n]. If de-duplication block size set B includes data block size e[n], at block 412, whether a file system in the file system set has de-duplication block size e[n] is determined. The de-duplication block size of the file system refers to a de-duplication block size supported by the storage system where the file system is located. For example, file system management module 112 or shared folder allocator 206 determines whether the file system set includes a second file system having a de-duplication block size. If the file system in the file system set has the de-duplication block size of e[n], at block 416, shared folder n is migrated to the second file system having de-duplication block size of e[n]. For example, when file system management module 112 or shared folder allocator 206 determines that the file system set includes the second file system having the de-duplication block size, the shared folder is migrated to the second file system.

If it is determined that the file system in the file system set does not have de-duplication block size e[n], a second file system is created in the storage system having de-duplication block size e[n] at block 414, and the second file system is added to the file system set. For example, file system management module 112 or shared folder allocator 206, in response to that the file system set does not include a file system having the de-duplication block size, establishes a second file system on the storage system having the de-duplication block size, and then adds the second file system to the file system set. Next, the process proceeds to block 416 to migrate the shared folder to the second file system. The method can quickly and accurately realize the migration of a shared folder and improve the de-duplication rate of the shared folder.

If it is determined at block 408 that de-duplication block size set B supported by the storage system set does not include data block size e[n], it is determined at block 410 whether shared folder n belongs to the file system having de-duplication block size min(B), where min( ) indicates taking a minimum value. For example, file system management module 112 or shared folder allocator 206 determines whether the shared folder belongs to a file system having the minimum de-duplication block size in the de-duplication block size set in response to that the de-duplication block size set does not include the de-duplication block size that is the same as the target data block size. If shared folder n belongs to the file system having de-duplication block size min(B), it indicates that the shared folder has provided a possibly optimal de-duplication rate in the file system having the minimum de-duplication block size. Therefore, no further operation is required. If shared folder n does not belong to the file system having de-duplication block size min(B), it is required to adjust e[n]=min(B) at block 418. Therefore, when the storage system of the first file system where the shared folder is located does not have the minimum de-duplication block size in the de-duplication block size set, the target data block size of the shared folder is updated to the minimum de-duplication block size to adjust the shared folder to the file system on the storage system having the minimum de-duplication block size through blocks 408, 412, and 416, thereby improving the de-duplication rate of the shared folder.

The method can improve the efficiency of deleting duplicate data and increase the amount of deleted duplicate data, thereby saving storage space and improving the resource utilization.

A schematic diagram of processing data according to an embodiment of the present disclosure is described above with reference to FIG. 4. A schematic diagram of an example file system according to an embodiment of the present disclosure is further described below with reference to FIG. 5A to FIG. 5B.

Figure 5A:
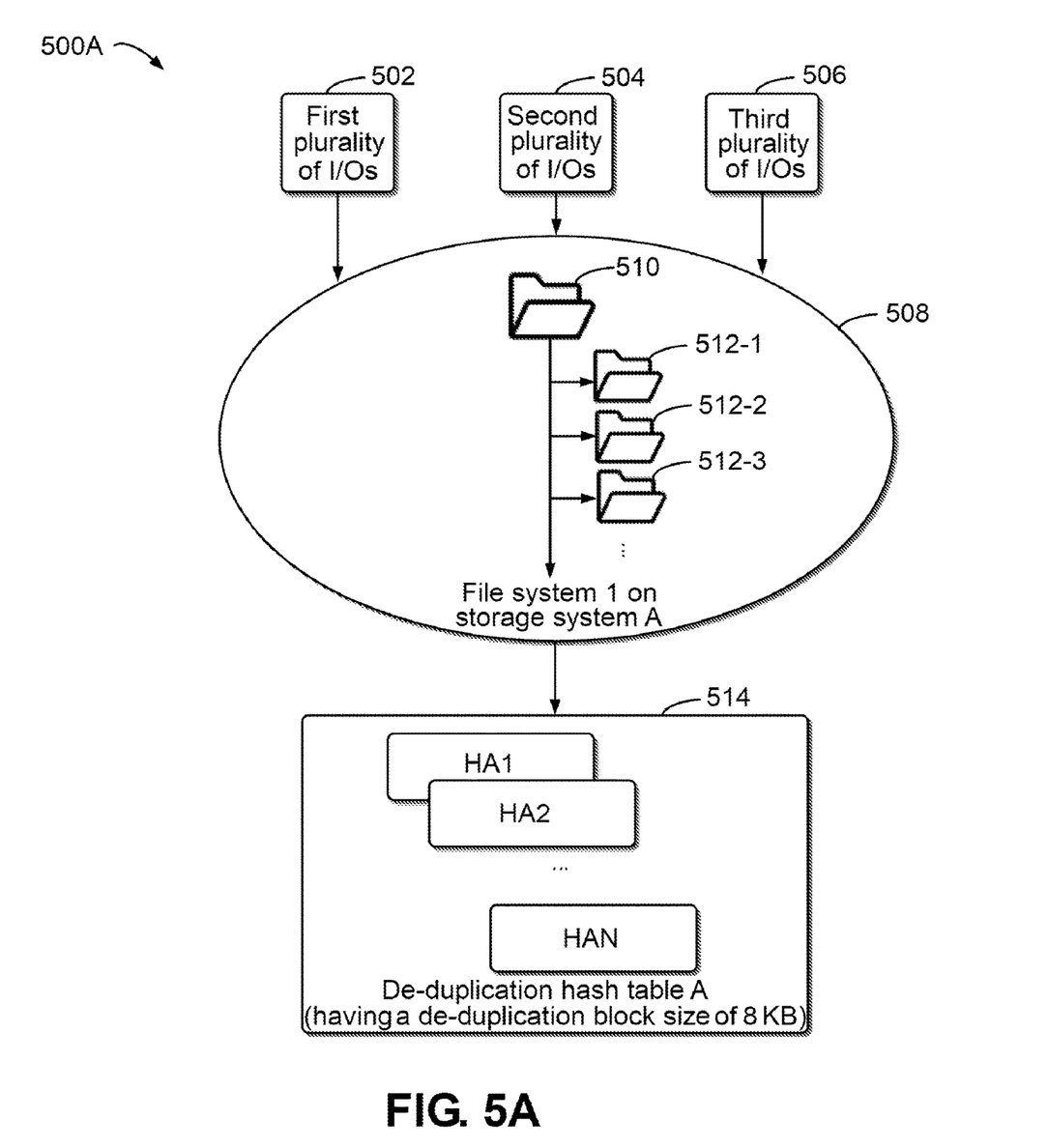
FIG. 5A to FIG. 5B illustrate schematic diagrams of an example file system according to an embodiment of the present disclosure.
Figure 5B:
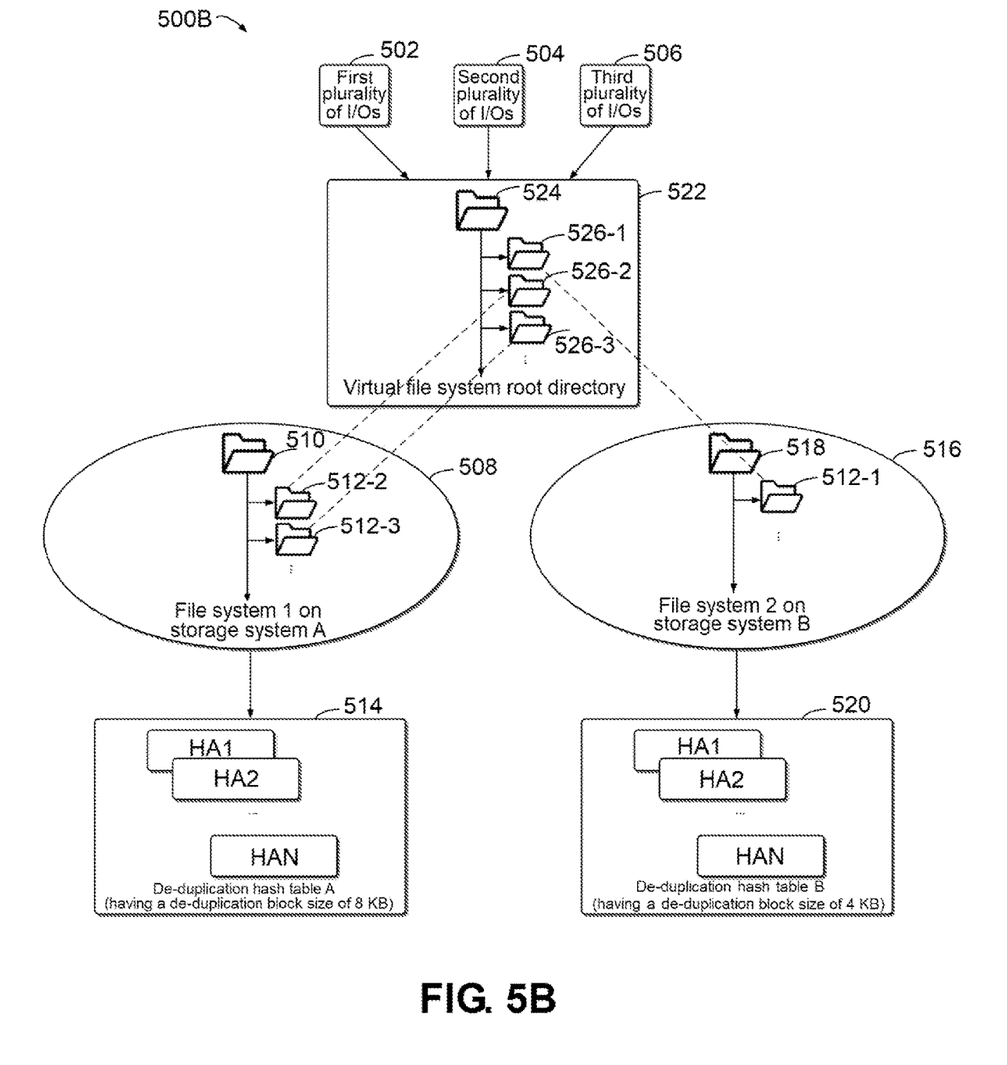

As shown in FIG. 5A, when it starts to create a first file system of the file system set on the storage system set, default storage system A or a user specified storage system may be selected to generate file system 1 508. File system 1 508 includes root folder 510 and a plurality of shared folders 512-1, 512-2, 512-3, and the like. File system 1 includes first plurality of I/Os 502, second plurality of I/Os 504, and third plurality of I/Os 506 that access shared folders 512-1, 512-2, and 512-3. Then, entries on de-duplication hash table A 514 are used for de-duplicating data blocks. As mentioned above, for each shared folder, whether it needs to be migrated may be determined according to its de-duplication rate. As shown in FIG. 5B, if shared folder 512-1 needs to be migrated to a file system on storage system B, since no file system has been established on storage system B, it is required to create new file system 516 on storage system B, including root text folder 518, and then migrate shared folder 512-1 to file system 2 516. Then, de-duplication hash table B 520 is used for data de-duplication. In an example, when the number of file systems serving the host I/O changes from one to two, it is required to acquire a shared folder located in the second file system and a remaining shared folder located in the first file system. Then, the shared folder and the remaining shared folder are used for generating a root directory for the file system set, and the root directory includes a group of virtual folders mapped to the shared folder and the remaining shared folder. For example, when file systems on two storage systems are used to provide services, it is required to generate root directory 522 of a virtual file system to provide access to shared folders 512-1, 512-2, and 512-3 on different storage systems. The virtual file system includes root folder 524 and a plurality of shared folders 526-1, 526-2, and 526-3. The plurality of shared folders 526-1, 526-2, and 526-3 are mapped to corresponding shared folders 512-1, 512-2, and 512-3 respectively. Similarly, when a new shared folder is created in the file system on the storage system, a corresponding virtual folder needs to be created in root directory 522 of the virtual file system.

The method can improve the efficiency of deleting duplicate data and increase the amount of deleted duplicate data, thereby saving storage space and improving the resource utilization.

An example for processing data according to an embodiment of the present disclosure is described in detail below. In the example, there are two storage systems A and B as back-end storage, as shown in FIG. 2B. A de-duplication data block size of storage system A is 8 KB, and a de-duplication data block size of storage system B is 4 KB. Storage system A is a default storage system for creating a file system. In addition, a user may choose to create a file system on storage system A or storage system B. For the two storage systems, B=[8,4], in a unit of 'KB.' Then, four shared folders are created for serving host I/Os. Target data block size E for the four shared folders is initialized to E=[8,8,8,8].

H1 indicates that host 1 is running an application (mainly in a block size of 4 KB) on shared folder 1, H2 indicates that host 2 is running an application (mainly in a block size of 4 KB) on shared folder 1, and H3 indicates that host 3 is running an application (mainly in a block size of 8 KB) on shared folder 2; H4 indicates that host 4 is running applications (32 KB and 16 KB, with a ratio of 10:1) on shared folder 3. Shared folder 4 has been created, but no application is running on it.

The shared I/O analyzer works in this case and updates data block size E=[4,8,16,8] for four shared domains. The action of updating E by the shared I/O analyzer will trigger the shared folder allocator. First, E[1] is checked. When de-duplication rate D[1] of shared folder 1 is not ideal and is lower than D_LWM, shared folder migration is triggered. At this time, if E[1]=4 is determined, file system FS2 with a logical size of 1 TB is newly created on storage system B and added to F. Original shared folder 1 on FS1 will be migrated to FS2. After the migration, a link of shared folder 1 is redirected to a new shared domain on FS2. Next, it is required to create a combined file system root directory to route host share access, as shown in FIG. 5B.

Next, E[3] will be further checked, but D[3] is not less than D_LWM, and therefore, no operation will be performed on shared domain 3. If new shared folder 5 is further created to serve host H5 for an application having a small data block size (<4 KB). The shared I/O analyzer is triggered to track I/Os on shared folder 5. The action of updating E=[4,8,16, 8,S] by the shared I/O analyzer will trigger the shared folder check. If de-duplication rate D[5] is not ideal on storage system A, shared folder 5 may be selected for migration to FS2. By distributing an incoming data block to a more appropriate de-duplication domain according to an attribute of the incoming data block of each shared folder, the efficiency of de-duplication is improved.

Figure 6:
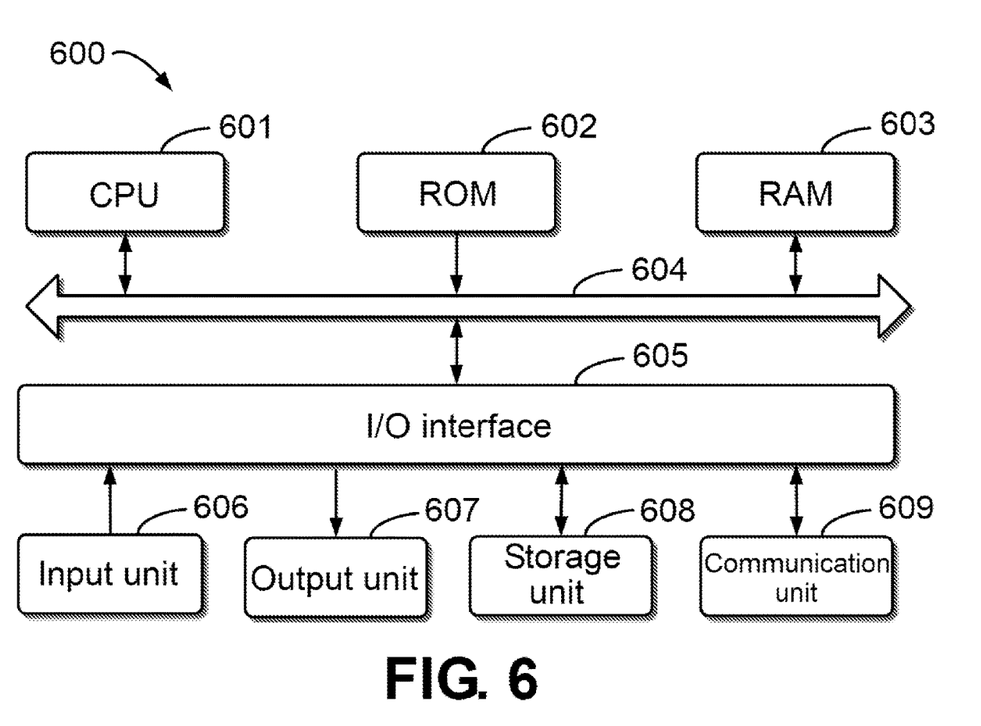
FIG. 6 illustrates a schematic block diagram of an example device suitable for implementing embodiments of the present disclosure.

FIG. 6 illustrates a schematic block diagram of example device 600 that may be used to implement embodiments of the present disclosure. Computing device 104 in FIG. 1 can be implemented using device 600. As shown in the figure, device 600 includes central processing unit (CPU) 601 that may execute various appropriate actions and processing according to computer program instructions stored in read-only memory (ROM) 602 or computer program instructions loaded from storage unit 608 to random access memory (RAM) 603. Various programs and data required for the operation of device 600 may also be stored in RAM 603.

CPU 601, ROM 602, and RAM 603 are connected to each other through bus 604. Input/output (I/O) interface 605 is also connected to bus 604.

A plurality of components in device 600 are connected to I/O interface 605, including: input unit 606, such as a keyboard and a mouse; output unit 607, such as various types of displays and speakers; storage unit 608, such as a magnetic disk and an optical disc; and communication unit 609, such as a network card, a modem, and a wireless communication transceiver. Communication unit 609 allows device 600 to exchange information/data with other devices via a computer network, such as the Internet, and/or various telecommunication networks.

The various processes and processing described above, for example, methods 300 and 400, may be executed by processing unit 601. For example, in some embodiments, methods 300 and 400 may be implemented as a computer software program that is tangibly included in a machine-readable medium such as storage unit 608. In some embodiments, part of or all the computer program may be loaded and/or installed onto device 600 via ROM 602 and/or communication unit 609. When the computer program is loaded into RAM 603 and executed by CPU 601, one or more actions of methods 300 and 400 described above may be executed.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device over a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or a plurality of programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

Various aspects of the present disclosure are described here with reference to flow charts and/or block diagrams of the method, the apparatus (system), and the computer program product according to the embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means (e.g., specialized circuitry) for implementing functions/actions specified in one or a plurality of blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or a plurality of blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or a plurality of blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or a plurality of executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

The embodiments of the present disclosure have been described above. The above description is illustrative, rather than exhaustive, and is not limited to the disclosed various embodiments. Numerous modifications and alterations are apparent to persons of ordinary skill in the art without departing from the scope and spirit of the illustrated embodiments. The selection of terms as used herein is intended to best explain the principles and practical applications of the various embodiments or technical improvements to technologies on the market, or to enable other persons of ordinary skill in the art to understand the embodiments disclosed here.

The invention claimed is:

1. A method for processing data, comprising:
in response to acquiring a target data block size for a shared folder of a first file system in a file system set, determining a de-duplication rate for the shared folder, the de-duplication rate indicating a degree to which storage space is saved;
acquiring a de-duplication block size set supported by a storage system set for the file system set in response to determining that the de-duplication rate is less than a threshold de-duplication rate;
determining whether the de-duplication block size set comprises a de-duplication block size that is the same as the target data block size; and
migrating the shared folder to a second file system in the file system set in response to the de-duplication block size set comprising the de-duplication block size that is the same as the target data block size, the second file system being located on a storage system having the de-duplication block size in the storage system set;
creating the shared folder in the first file system;
determining the target data block size of the shared folder as an initial data block size;
determining the distribution of a plurality of incoming data blocks into the shared folder in a predetermined period of time on a plurality of candidate data block sizes, the distribution comprising a plurality of numbers of incoming data blocks corresponding to the plurality of candidate data block sizes; and
determining, based on the distribution, an adjustment of the target data block size.

2. The method according to claim 1, wherein the shared folder is initially located on a first storage system; and
wherein migrating the shared folder includes:
relocating the shared folder from the first storage system to a second storage system.

3. The method according to claim 1, wherein determining the distribution comprises:
adding, in response to receiving an incoming data block corresponding to a candidate data block size of the plurality of candidate data block sizes, the number corresponding to the candidate data block size.

4. The method according to claim 1, wherein determining the adjustment of the target data block size comprises:
determining a maximum number from the plurality of numbers;
determining whether the maximum number is greater than a first threshold, the first threshold being used for instructing outputting a data block size of the shared folder;
determining, in response to that the maximum number is greater than the first threshold, whether the maximum number is greater than a second threshold, the second threshold being used for instructing updating the data block size of the shared folder; and
updating, in response to that the maximum number is greater than the second threshold, the target data block size to a candidate data block size corresponding to the maximum number among the plurality of candidate data block sizes.

5. The method according to claim 4, wherein determining the adjustment of the target data block size further comprises:
not adjusting the target data block size if it is determined that the maximum number is less than or equal to the second threshold.

6. The method according to claim 4, wherein determining the adjustment of the target data block size further comprises:
continuing to determine, in response to that the maximum number is less than or equal to the first threshold, the distribution of incoming data blocks into the shared folder on the plurality of candidate data block sizes in a next predetermined period of time, for determining the adjustment of the target data block size.

7. The method according to claim 1, wherein determining the de-duplication rate comprises:
determining a de-duplication saved space for the shared folder;
determining a logical use space for the shared folder; and
determining the de-duplication rate based on the de-duplication saved space and the logical use space.

8. The method according to claim 1, wherein migrating the shared folder to the second file system comprises:
determining whether the file system set comprises the second file system having the de-duplication block size; and
migrating the shared folder to the second file system in response to that the file system set comprises the second file system having the de-duplication block size.

9. The method according to claim 8, wherein migrating the shared folder to the second file system further comprises:
establishing, in response to that the file system set does not comprise a file system having the de-duplication block size, the second file system on the storage system having the de-duplication block size;

adding the second file system to the file system set; and migrating the shared folder to the second file system.

10. The method according to claim 9, the method further comprising:
acquiring the shared folder located in the second file system and a remaining shared folder located in the first file system; and
generating, based on the shared folder and the remaining shared folder, a root directory for the file system set, the root directory comprising a group of virtual folders mapped to the shared folder and the remaining shared folder.

11. The method according to claim 1, further comprising:
determining, in response to that the de-duplication block size set does not comprise the de-duplication block size that is the same as the target data block size, whether the shared folder belongs to a file system having a minimum de-duplication block size in the de-duplication block size set; and
updating, in response to that the shared folder belongs to the file system having the minimum de-duplication block size in the de-duplication block size set, the target data block size of the shared folder to the minimum de-duplication block size.

12. An electronic device, comprising:
at least one processor; and
a memory coupled to the at least one processor and having instructions stored therein, wherein the instructions, when executed by the at least one processor, cause the device to perform actions comprising:
in response to acquiring a target data block size for a shared folder of a first file system in a file system set, determining a de-duplication rate for the shared folder, the de-duplication rate indicating a degree to which storage space is saved;
acquiring a de-duplication block size set supported by a storage system set for the file system set in response to determining that the de-duplication rate is less than a threshold de-duplication rate;
determining whether the de-duplication block size set comprises a de-duplication block size that is the same as the target data block size; and
migrating the shared folder to a second file system in the file system set in response to the de-duplication block size set comprising the de-duplication block size that is the same as the target data block size, the second file system being located on a storage system having the de-duplication block size in the storage system set;
creating the shared folder in the first file system;
determining the target data block size of the shared folder as an initial data block size;
determining the distribution of a plurality of incoming data blocks into the shared folder in a predetermined period of time on a plurality of candidate data block sizes, the distribution comprising a plurality of numbers of incoming data blocks corresponding to the plurality of candidate data block sizes; and
determining, based on the distribution, an adjustment of the target data block size.

13. The electronic device according to claim 12, wherein the shared folder is initially located on a first storage system; and
wherein migrating the shared folder includes:
relocating the shared folder from the first storage system to a second storage system.

14. The electronic device according to claim 12, wherein determining the distribution comprises:

adding, in response to receiving an incoming data block corresponding to a candidate data block size of the plurality of candidate data block sizes, the number corresponding to the candidate data block size.

15. The electronic device according to claim 12, wherein determining the adjustment of the target data block size comprises:
determining a maximum number from the plurality of numbers;
determining whether the maximum number is greater than a first threshold, the first threshold being used for instructing outputting a data block size of the shared folder;
determining, in response to that the maximum number is greater than the first threshold, whether the maximum number is greater than a second threshold, the second threshold being used for instructing updating the data block size of the shared folder; and
updating, in response to that the maximum number is greater than the second threshold, the target data block size to a candidate data block size corresponding to the maximum number among the plurality of candidate data block sizes.

16. The electronic device according to claim 15, wherein determining the adjustment of the target data block size further comprises:
not adjusting the target data block size if it is determined that the maximum number is less than or equal to the second threshold.

17. The electronic device according to claim 15, wherein determining the adjustment of the target data block size further comprises:
continuing to determine, in response to that the maximum number is less than or equal to the first threshold, the distribution of incoming data blocks into the shared folder on the plurality of candidate data block sizes in a next predetermined period of time, for determining the adjustment of the target data block size.

18. The electronic device according to claim 12, wherein determining the de-duplication rate comprises:
determining a de-duplication saved space for the shared folder;
determining a logical use space for the shared folder; and
determining the de-duplication rate based on the de-duplication saved space and the logical use space.

19. The electronic device according to claim 12, wherein migrating the shared folder to the second file system comprises:
determining whether the file system set comprises the second file system having the de-duplication block size; and
migrating the shared folder to the second file system in response to that the file system set comprises the second file system having the de-duplication block size.

20. A computer program product having a non-transitory computer readable medium which stores a set of instructions to process data; the set of instructions, when carried out by computerized circuitry, causing the computerized circuitry to perform a method of:
in response to acquiring a target data block size for a shared folder of a first file system in a file system set, determining a de-duplication rate for the shared folder, the de-duplication rate indicating a degree to which storage space is saved;
acquiring a de-duplication block size set supported by a storage system set for the file system set in response to determining that the de-duplication rate is less than a threshold de-duplication rate;

determining whether the de-duplication block size set comprises a de-duplication block size that is the same as the target data block size; and migrating the shared folder to a second file system in the file system set in response to the de-duplication block size set comprising the de-duplication block size that is the same as the target data block size, the second file system being located on a storage system having the de-duplication block size in the storage system set;

creating the shared folder in the first file system;

determining the target data block size of the shared folder as an initial data block size;

determining the distribution of a plurality of incoming data blocks into the shared folder in a predetermined period of time on a plurality of candidate data block sizes, the distribution comprising a plurality of numbers of incoming data blocks corresponding to the plurality of candidate data block sizes; and determining, based on the distribution, an adjustment of the target data block size.

\* \* \* \* \*